Patented June 30, 1942

2,287,986

UNITED STATES PATENT OFFICE 2,287,986

RESINOUS COATING COMPOSITION

Daniel Mace Gowing, Upper Darby, and Philip Francis Sanders, Philadelphia, Pa., assignors to E. I. du Pont de Nemours & Company, Wilmington, Del., a corporation of Delaware No Drawing. Application April 18, 1940, Serial No. 330,268

9 Claims. (Cl. 260—22)

This invention relates to decorative and protective coating compositions and more particularly to such coating compositions having a resinous vehicle as a base.

In the manufacture of so-called air drying alkyd resin enamels it is a common practice to use drying oil or semi-drying oil or oil acid modified polyhydric alcohol-polycarboxylic acid resins as the sole or principal resin vehicle. These resins as commonly prepared are considered as high acid number resins, the acid number averaging between 30 and 40 but often being considerably above 40. Enamels prepared from such resins often do not exhibit a uniform retention of drying properties on storage and may thus become unreliable so far as the results desired in the practical application thereof is concerned. For example, a black air drying enamel which when freshly prepared dries satisfactorily in five hours may not dry satisfactorily in ten hours after container storage under normal conditions.

This loss of drying ability of the enamels is not uniform and further not absolutely reproducible which factors add to the complexity of the situation. The use of an extra quantity of metallic drier in the enamel as initially prepared is ineffective in assuring a maintenance of uniform drying of such enamels on storage. Furthermore, there are marked limitations on the amount of metallic drier which can be used without jeopardizing other desirable and necessary properties of the enamels.

This invention has as a principal object the provision of means for preparing synthetic resin enamels having satisfactory initial air drying properties and retaining these properties on storage. A further object is the provision of means for preparing such enamels in which drying oil, semi-drying oil or oil acid modified polyhydric alcohol-polybasic acid resins make up the principal vehicle. A still further object is the manufacture of such enamels possessing the retention of satisfactory drying properties while maintaining the other necessary and desirable properties of the enamel as build, gloss etc.

Other objects will be apparent as the description of the invention proceeds.

These objects are accomplished in the present invention by incorporating into the enamel composition a small percentage of diphenyl or triphenyl guanidine.

The invention will be more fully understood from the following examples which are given by way of illustration but not by limitation except insofar as defined by the appended claims. The parts are by weight.

EXAMPLE I

*Black enamel*

| | Parts |
|---|---|
| Carbon black | 2.42 |
| Alkyd resin A | 16.25 |
| Alkyd resin B | 17.90 |
| Cobalt drier solution | 2.75 |
| Manganese drier solution | 1.15 |
| Lead drier solution | 1.67 |
| Diphenyl guanidine | 1.02 |
| Petroleum naphtha | 56.84 |
| | 100.00 |

Alkyd resin A is a 52% linseed oil modified glycerol phthalate having an acid number of approximately 6.5.

Alkyd resin B is a 50% Chinawood-linseed oil modified glycerol phthalate having an acid number of approximately 35.

The drier solutions are solutions of the naphthenates of the respective metals in mineral spirits; the solutions containing 2%, 3%, and 16% respectively, of cobalt, manganese, and lead.

The enamel is prepared in any manner well known in the art. The pigment is dispersed in a part or the whole of the alkyd resin solution or to which has been added a portion of the petroleum naphtha by any suitable or available conventional means as a roller mill, ball or pebble mill, etc. The drier solutions are then added and the mass thoroughly agitated. Finally the diphenyl guanidine is added and, if not all previously added, the remainder of the petroleum naphtha. The enamel is now ready for use.

The diphenyl guanidine may be added to the final enamel or to the dispersion of the pigment in the high acid number resin. The point at which the diphenyl guanidine is added is not critical.

This enamel when flowed or sprayed on a suitable base as a steel panel, air dried tack free in approximately 3 hours. An enamel of the same composition as to ingredients and amounts but containing no diphenyl guanidine requires approximately 4½ hours to air dry tack free.

This black enamel after being stored in a suitably closed container for six months dried tack free in approximately 3 hours, whereas the same enamel containing no diphenyl guanidine required 9 hours to air dry tack free.

It is thus apparent that the enamel containing the diphenyl guanidine not only air dries initially more quickly than a similar enamel containing no diphenyl guanidine but also retains its desirable drying properties on storage.

EXAMPLE II

*White enamel*

| | Parts |
|---|---|
| Antimony oxide | 12.17 |
| Titanium dioxide | 12.17 |
| Alkyd resin A | 4.50 |
| Alkyd resin B | 21.40 |
| Cobalt drier solution | .82 |
| Manganese drier solution | .20 |
| Lead drier solution | .84 |
| Diphenyl guanidine | .78 |
| Petroleum naphtha | 47.12 |
| | 100.00 |

The alkyd resins and the drier solutions used in the above enamel were the same as used in the previous example. The enamel was prepared according to the procedure described under Example I.

This enamel when applied to a suitably prepared base air dries in approximately 3 hours, whereas a similar enamel containing no diphenyl guanidine requires upwards of 5 hours to air dry tack free. On storage for a period of 5 months the enamel containing the diphenyl guanidine required four hours to air dry tack free while the enamel containing no diphenyl guanidine required 8 hours to air dry tack free, thus increasing its drying time by approximately 60%.

In the preceding examples the amount of diphenyl guanidine based on the resin content of the enamels is approximately 3%.

EXAMPLE III

*Black enamel*

| | Parts |
|---|---|
| Carbon black | 2.04 |
| Prussian blue | .70 |
| Alkyd resin A | 9.73 |
| Alkyd resin C | 22.75 |
| Cobalt drier solution | 2.80 |
| Manganese drier solution | 1.33 |
| Lead drier solution | 1.75 |
| Diphenyl guanidine | .32 |
| Petroleum naphtha | 58.58 |
| | 100.00 |

Alkyd resin A is the same as used in Examples I and II. Alkyd C is a 45% Chinawood-linseed oil modified glycerol phthalate having an acid number of approximately 45. The drier solutions used were as described under Example I.

This enamel was prepared according to the procedure previously described and contained approximately 1% of diphenyl guanidine based on the resin content.

This enamel was found to air dry tack free in approximately 4 hours. A similar composition containing no diphenyl guanidine required 5 hours to air dry tack free, the diphenyl guanidine containing enamel therefore showing a decrease in initial drying time of 25%.

An enamel similar to the above containing 5% diphenyl guanidine based on the resin content was found to air dry tack free in approximately 2½ hours or 50% of the time required for the enamel containing no diphenyl guanidine to air dry tack free.

Another enamel containing 10% of diphenyl guanidine based on the resin content air dried tack free in approximately 2 hours as compared to the 5 hours required for the same enamel containing no diphenyl guanidine. When the amount of diphenyl guanidine was increased beyond 10% no improvement in the drying time of the enamel resulted; there resulted in fact a reduction in the drying time improvement of the enamel. Compositions containing less than 1% of diphenyl guanidine based on the resin content show a perceptible improvement in reduction of drying time even when as low as 0.10% was used. Amounts less than 0.10% showed no improvement.

The effective range for diphenyl guanidine content of the enamel based on the resin content is 0.10 to 10%, with a preferred range of 3–5%.

In the claims the term diphenyl guanidine is intended to be inclusive of triphenyl guanidine since these two compounds are full equivalents in the present invention and are interchangeable.

All these compositions with the varying amounts of diphenyl guanidine retained their drying properties on storage in contrast to a marked increase in time required to dry satisfactorily after storage of similar enamels containing no diphenyl guanidine.

While the above examples are confined to black and white enamels the invention is applicable to other colored enamels in which various types of pigments and fillers may be used as well as to unpigmented compositions.

The diphenyl guanidine in the enamels does not serve simply as an additional drier since it has been found to be ineffective in compositions containing no drier, in some instances having a detrimental effect. Furthermore, its effectiveness with respect to drier is selective, e. g. being effective with cobalt drier when used alone, slightly effective when used with manganese drier alone, but ineffective when used alone with lead drier. However, it is satisfactorily effective when used with a combination of any two of the metallic driers or with a combination of the three as noted in the examples. This selective action is of a qualitative rather than of a quantitative nature.

The diphenyl guanidine is further ineffective with low acid number fatty oil or oil acid modified polyhydric alcohol-polycarboxylic acid resins. While the acid number of fatty oil or oil acid modified alkyds commonly used in the preparation of enamels may be as high as 65 or above, the average of those mostly used is between 20 and 40. The minimum acid number of the resin for the diphenyl guanidine to be effective has been found to be approximately 10. The range then for acid number of the alkyd resin may conveniently be from 10 upwards. No maximum acid number for the alkyd resin (as ordinarily used) in which the diphenyl guanidine was ineffective has been found.

The drying oil, semi-drying oil, or oil acid modified alkyd resins used in the present invention are usually such as are modified to the extent of from 35 to 65%.

While the above examples are in connection with air drying enamels the invention is also applicable for use in the preparation of baking enamels.

It might appear that the diphenyl guanidine would be effective with any so-called high acid number vehicle. This has not, however, been found to be the case, since the diphenyl guanidine is ineffective as in the present instance with oleoresinous type vehicles of comparable acid number.

The compositions of the present invention are adaptable for use as decorative and protective coating compositions for application to various surfaces as wood, metal, glass, molded synthetic resin articles, hard rubber, etc. The compositions may be applied by brushing, spraying, dipping, roller coating processes, etc., or by any other means known to those skilled in the art. The compositions are particularly adaptable to the refinishing of automotive vehicle bodies by the usual standard procedures.

It will be apparent from the above that enamel compositions have been prepared which substantially retain their initial drying properties on storage and in addition possess improved initial drying properties, with respect to time, over alkyd resin enamels used in the present state of the art. Furthermore, these improved properties are imparted to the enamels without any sacrifice of other desirable and necessary properties of the compositions as build, gloss, color, etc. Other advantages will be apparent to those skilled in the art of preparing such compositions.

It is apparent that many widely different embodiments of this invention may be made without departing from the spirit and scope thereof, and therefore, it is not intended to be limited except as indicated in the appended claims.

We claim:

1. An enamel comprising an alkyd resin from the class consisting of fatty oil and fatty oil acid modified alkyd resins having an acid number greater than 10, at least two driers selected from the class consisting of cobalt, manganese, and lead soaps, and from .10 to 10% of material selected from the class consisting of diphenyl guanidine and triphenyl guanidine based on the resin content of the enamel.

2. An enamel comprising an oil modified alkyd resin having an acid number greater than 10, from 3 to 5% thereof of material selected from the class consisting of diphenyl guanidine and triphenyl guanidine, and at least two driers selected from the class consisting of cobalt, manganese, and lead soaps.

3. The product of claim 2 in which the oil is a drying oil.

4. The product of claim 2 in which the resin is modified with a semi-drying oil.

5. The product of claim 2 in which the resin is modified with oil acids.

6. The product of claim 2 in which the resin is modified to the extent of from 35 to 65%.

7. The product of claim 2 in which the acid number of the resin is between 20 and 40.

8. An enamel comprising pigment, an oil modified alkyd resin having an acid number between 20 and 40, a cobalt, manganese, and lead drier, and from 3 to 5% of material selected from the class consisting of diphenyl guanidine and triphenyl guanidine based on the resin content.

9. A coating composition adapted to dry in air, comprising an oil-modified alkyd resin having an acid number greater than 10, cobalt naphthenate, manganese naphthenate, lead naphthenate, and from .10 to 10% of a material selected from the class consisting of diphenyl guanidine and triphenyl guanidine.

DANIEL MACE GOWING.
PHILIP FRANCIS SANDERS.